Patented Dec. 30, 1941

2,268,387

UNITED STATES PATENT OFFICE 2,268,387

PRESERVATION OF WOOD

Albert Lawrence Flenner and Frank Henry Kaufert, Wilmington, Del., assignors to E. I. du Pont de Nemours & Company, Wilmington, Del., a corporation of Delaware No Drawing. Application April 7, 1939,
Serial No. 266,544

4 Claims. (Cl. 167—38.6)

This invention relates to the treatment of wood and similar cellulosic products to prevent fungal attack, especially of freshly sawn lumber during the seasoning period, and is more particularly directed to processes in which the wood or similar cellulosic material is treated in an aqueous solution containing ethyl mercury phosphate and sufficient borax to impart an alkaline reaction to the solution, and still more particularly describes compositions for use in preparing these treating solutions which contain as essential ingredients ethyl mercury phosphate and borax.

The three principal prerequisites of aqueous solutions used for treating freshly sawn lumber to protect it from attack of fungi that stain and otherwise discolor the wood during the seasoning period are: (1) The active principal must have high toxicity to the various organisms causing the damage; (2) the solutions must have an alkaline reaction (to prevent corrosion of the metal dipping baths and to prevent formation of iron tannate stains on woods such as oak and chestnut); and (3) the treatment must be effective throughout the normal seasoning period and often for much extended seasoning periods brought about by adverse weather conditions.

Ethyl mercury chloride is commonly employed as the active principal of such treating solutions and is known to be highly toxic to the organisms causing damage to the wood. Compositions containing ethyl mercury chloride, together with sodium sulfate as a carrier and soda ash as an alkaline ingredient, are known for these purposes and when dissolved in water provide solutions adequately satisfying the first two of the above noted prerequisites. In some instances, especially under adverse weather conditions, such solutions fail in regard to the third prerequisite. While such treatments afford fairly satisfactory control of blue staining fungi. *Ceratostomella pilifera, Diplodia natalensis, Ceratostomella plurianulata, Endoconidiophora coerulescens,* and *Graphium* sp., for normal seasoning periods, they are not so effective when the seasoning periods are much lengthened due to rain, heavy fogs, or other conditions that interfere with rapid drying of the lumber. Our investigations have shown that this lack of protection against blue staining fungi of the above types during extended seasoning periods could be attributed to the fact that the ethyl mercury chloride on prolonged exposure volatilized from the surface of the lumber, thereby allowing the growth of the fungi and development of the objectionable blue stain.

We have now found that improved control of these fungi during severe and much extended seasoning periods is obtained if the lumber is treated with an aqueous solution containing ethyl mercury phosphate and sufficient borax to give the solution an alkaline reaction, especially treating solutions such as may be prepared from compositions containing as essential ingredients ethyl mercury phosphate and borax. Treatment with such solutions gives the high initial toxicity to fungi characteristic of the ethyl mercury salts and at the same time gives markedly superior results in preventing or reducing the attack of fungi when, due to weather conditions, the surface of the lumber remains sufficiently moist to support fungous growth for periods up to three to four months after application of the solutions.

The lower vapor pressure of ethyl mercury phosphate as compared to ethyl mercury chloride does not alone account for the superior results obtained by the use of compositions of our invention. Quite the contrary, when ethyl mercury phosphate is used together with sodium sulfate as a carrier and soda ash as an alkaline ingredient, that is, when ethyl mercury phosphate is substituted for ethyl mercury chloride in the prior art formulations, the control of blue staining fungi is relatively inferior. Apparently the sodium sulfate and soda ash act in some manner to increase the volatility of the ethyl mercury phosphate. Possibly the condition of equilibrium set up by hydrolysis of the ethyl mercury salt, the sodium sulfate and the soda ash is responsible. We find that insoluble carriers such as talc, which are not subject to hydrolysis, do not exhibit this deleterious effect and that borax, though subject to hydrolysis, has a distinctly beneficial effect.

In treating freshly sawn lumber according to our invention it is desirable to have the ethyl mercury phosphate present in the treating solution in a concentration of approximately 1:6,000. In some cases the concentration may be as low as 1:15,000, but ordinarily this will be found too low to give satisfactory protection unless a fungicide of another type is also included. Concentrations greater than 1:6,000 may be used but are uneconomical. In such solutions there should be sufficient borax present to give the solution an alkaline reaction. Ordinarily, less than one per cent will suffice. Suitably from 0.15 to 1.5 per cent may be employed.

A composition which has proven entirely satisfactory for making up treating solutions contains 6.25 per cent ethyl mercury phosphate, 20 per cent talc, and the balance borax. In a fine state of sub-division such a composition is a free-flowing powder which is easily handled and weighed, and when added to water in proportions of about two pounds per one hundred gallons will give a treating solution containing about 0.016 per cent ethyl mercury phosphate and about two-tenths per cent borax. The talc, though insoluble, disperses readily in the treating solution and does not interfere in any way with the efficacy of the treatment. Talc is employed in our compositions to improve their physical properties. It may be replaced with other finely divided inerts.

The compositions of our invention are not limited to any particular proportions since more or less, depending upon the amount of ethyl mercury phosphate, may be used as required to give the desired concentration in the treating solution. It is desirable, however, to use at least about ten and not more than about twenty-five parts of borax for each part of ethyl mercury phosphate. The talc or other insoluble inert is preferably kept less than about six parts for each part of ethyl mercury phosphate. A greater proportion is undesirable in view of its insolubility. It is used preferably in the proportion of at least about three parts for each part of ethyl mercury phosphate. Within these limits free flowing compositions are provided which dissolved in water to the desired concentration of ethyl mercury phosphate yield solutions which may be used for treating various types of lumber without development of objectionable discoloration, either from fungi or iron tannate staining.

In place of pure ethyl mercury phosphate we may use the reaction products of mercuric phosphate and lead tetra ethyl in accordance with the general teachings found in the Engelmann and Tisdale patent 1,874,260 dated August 30, 1932. In such case the talc or other insoluble inert is incorporated into the reaction mixture as in the following example: six hundred sixty parts of mercuric oxide wetted with five hundred thirty parts of lead tetra ethyl are thoroughly mixed with twenty-three hundred parts of talc. This mixture is wetted with sufficient ethyl alcohol to form a paste and three hundred sixty-four parts of eighty-five per cent phosphoric acid are stirred in. The reaction is vigorous and immediate. The reaction mixture is then dried and mixed with sufficient borax to give a mercury content of about four and nine-tenths per cent. This will give a composition having an ethyl mercury phosphate equivalent of about six and twenty-five hundredths per cent. The proportions of talc and borax may be the same as already pointed out.

While we specify ethyl mercury phosphate and borax as essential ingredients they are of course not the exclusive ingredients. Thus, as already pointed out, our compositions may include other ingredients such as talc and like insoluble inerts, or products of the interaction of lead tetra ethyl and a mercuric salt. Other active agents and other supplements may also be included to advantage. Thus we have found the addition of about one to five parts of sodium pentachlorophenolate gives improved results.

The particular compositions described above are intended merely to illustrate our invention. Any modification or variation thereof coming within the scope and spirit of the invention are intended to be included within the scope of these claims.

We claim:

1. For the control of blue staining fungi on green wood, a composition containing sufficient active material effectively to prevent deleterious growth of blue staining fungi on green wood treated from an aqueous solution formulated of approximately one pound of the composition per 50 gallons of water, characterized in that the active material is predominantly ethyl mercury phosphate and in that borax is present in an amount sufficient to prevent corrosion and iron tannate staining.

2. For the control of blue staining fungi on green wood, a composition containing sufficient active material effectively to prevent deleterious growth of blue staining fungi on green wood treated from an aqueous solution formulated of approximately one pound of the composition per 50 gallons of water, characterized in that the active material is predominantly ethyl mercury phosphate conditioned with about six times its weight of talc and in that borax is present in an amount sufficient to prevent corrosion and iron tannate staining.

3. For the control of blue staining fungi on green wood, a composition containing sufficient active material effectively to prevent deleterious growth of blue staining fungi on green wood treated from an aqueous solution formulated of approximately one pound of the composition per 50 gallons of water, characterized in that the active material is predominantly ethyl mercury phosphate conditioned with about three to about six times its weight of talc and from about ten to about twenty-five times its weight of borax.

4. In the treatment of green lumber to protect it from attack by blue staining fungi which normally attack and discolor sap wood during the seasoning period, the method which comprises treating the lumber with ethyl mercury phosphate in an aqueous solution made alkaline by the hydrolysis of borax, the proportions being such that there are about ten to about twenty-five parts of borax for each part of ethyl mercury phosphate and the amounts being such that there is at least about one part of ethyl mercury phosphate for each 15,000 parts of solution and not substantially more than about one part of borax for each 100 parts of solution.

ALBERT LAWRENCE FLENNER.
FRANK HENRY KAUFERT.